ELECTROSTATIC STORAGE OF DIGITAL INFORMATION

Filed Feb. 23, 1952 2 Sheets-Sheet 1

Inventors:
G. I. Thomas
A. A. Robinson
By: Moore and Hall
Attorneys

INVENTORS:
G. I. THOMAS
A. A. ROBINSON
By: Moore and Hall
Attorneys

United States Patent Office 2,842,707

Patented July 8, 1958

2,842,707

ELECTROSTATIC STORAGE OF DIGITAL INFORMATION

Graham I. Thomas and Arthur Alexander Robinson, Hollinwood, England, assignors to National Research Development Corporation, London, England Application February 23, 1952, Serial No. 273,114

Claims priority, application Great Britain February 26, 1951

17 Claims. (Cl. 315—12)

The present invention relates to the storage of digital information using an electrostatic storage device of the type in which different digits are recorded within a digit area on an insulating recording surface in the form of different states of charge of an elemental area forming part of the digit area produced by a cathode ray beam, in which one of the states of charge of the elemental area is a positive charge produced by secondary emission from the elemental area, in which another of the states of charge is produced on the elemental area by secondary electrons subsequently released to the positively charged elemental area by the cathode ray beam from another part of the digit area, referred to as an adjacent area, in order to reduce the positive charge on the elemental area, and in which the information recorded on an elemental area is read by directing the cathode ray beam upon the area and thus developing in a signal plate capacitively coupled to the insulating surface a signal representative of the state of charge of the elemental area. The partial or complete neutralisation of the positive charge on the elemental area by secondary emission from the adjacent area will for convenience be referred to as a "refilling" operation. Devices of the type set forth are, for example, described in a paper by F. C. Williams and T. Kilburn, entitled, "A storage system for use with binary-digital computing machines," published in the Proceedings of the Institution of Electrical Engineers, part III, No. 40, March 1949, pages 81–100.

The said elemental area and adjacent area may be related to one another in a variety of different ways. For instance, when the digit areas are distributed along the X co-ordinate of deflection of the cathode ray beam, the adjacent area may be reached by a small deflection applied to the beam in the Y coordinate. In another method the elemental area is first bombarded using a poorly-focused beam and when refilling is required a second bombardment is effected using a sharply-focused beam: Thus in this case the adjacent area lies within the outer boundaries of elemental area. For convenience it will be assumed in this specification that the former of these two methods is adopted although the invention is not affected by which of a variety of different methods are used.

Figures 1, 2:
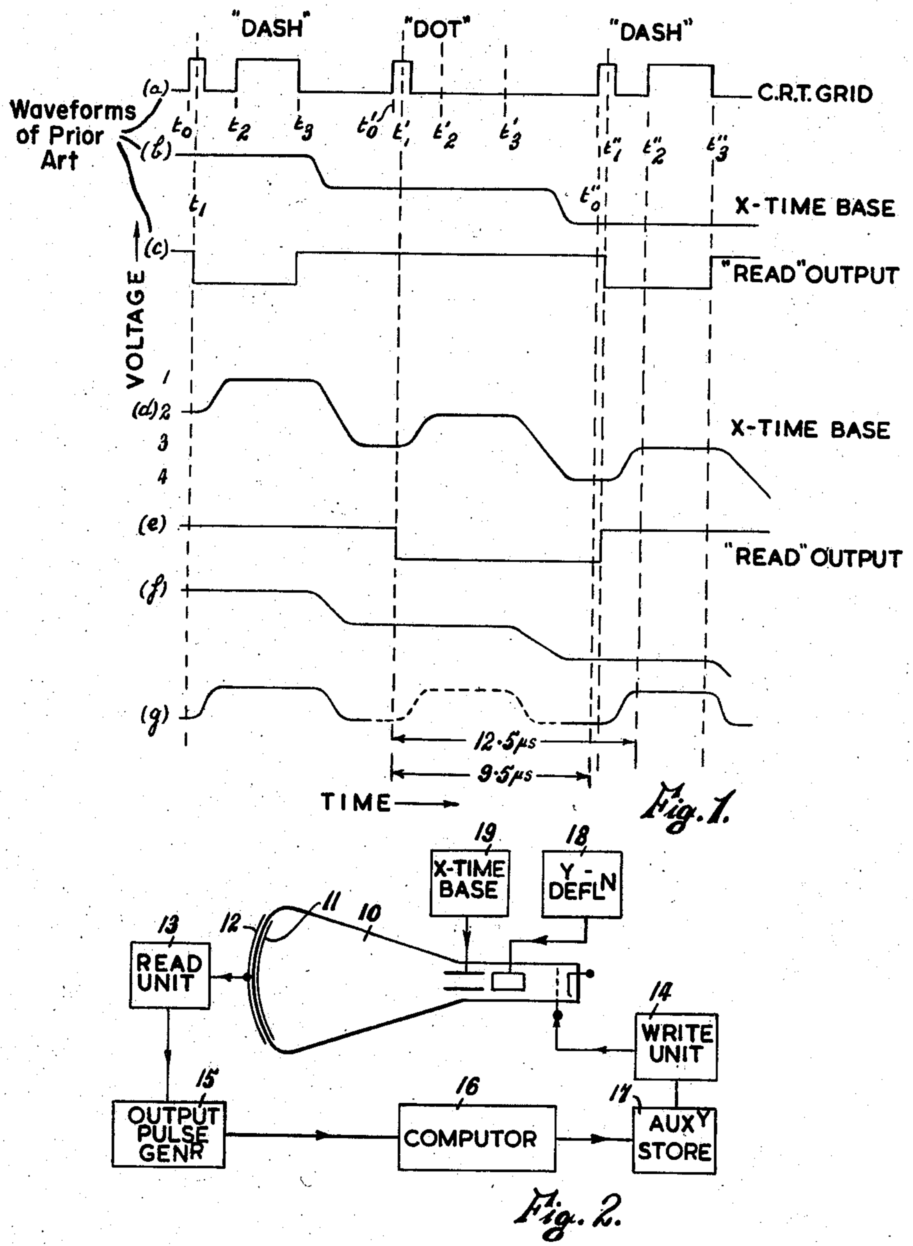

Referring to Figure 1 of the accompanying drawing, there are shown at (*a*), (*b*) and (*c*) waveforms that are used in a known storage system. The waveforms shown cover a period of time during which three digits are recorded and it is assumed that the digits to be recorded are "1," "0" and "1" respectively, marked "dash," "dot" and "dash" respectively in the drawing. The "1" or "dash" represents a condition in which the elemental area is uncharged, its charge having been neutralised by refilling, whilst the "0" or "dot" is represented by a positive charge on the elemental area. There is shown at (*a*) the waveform applied to the control grid of the cathode ray tube. When a "dash" is to be recorded the beam is switched on at a time $t_0$ for a period which may be, for example, 1 microsecond, and then switched off. At $t_2$ the beam is again switched on and is switched off at $t_3$. When a "dot" is to be recorded, the second switching on and off of the beam is omitted. It will be seen from curve (*b*) in Figure 1, which is the voltage applied to deflect the cathode ray beam in the X-co-ordinate, that during each digit interval the beam does not move in the X direction, and between digit intervals is moved rapidly forward in the X direction. Whether a "dot" or a "dash" is to be recorded, the beam is always deflected by a small amount in the Y co-ordinate during the period $t_2$ and $t_3$. However it will be understood that this deflection has no effect when the beam is switched off, and consequently it is effective only when a "dash" is being recorded.

In order to read the recorded information in the known storage system, the beam is turned on at the time $t_0$ and shortly after this time, for instance ½ microsecond after this time at $t_1$, the information required is available. In the case where the elemental area so explored is not charged, that is when the recorded information is a "1," a positive pulse is produced on the signal plate of the cathode ray tube. No positive pulse is, however, produced when the elemental area has a positive charge, and corresponds therefore to "0." The "read" output is shown at (*c*) and it will be observed that a pulse is produced to represent the numeral "1" or "dash" and no signal is produced to represent a "dot." As shown, the read output pulse is conveniently arranged to extend from the time $t_1$ to $t_3$.

In order to regenerate the charge upon the storage surface, the positive pulse, when produced on the signal plate, is caused to switch the beam on again at the time $t_2$ and when no positive pulse is produced the switching on at the time $t_2$ does not take place. When the information read from an elemental area at the time $t_1$ is passed to a computor an appropriate signal must be made available by the computor, not later than the time $t_2$, as a result of some operation performed in the computor, which will either maintain the state of charge on the elemental area the same as before, or change it. In the cases, therefore, both of regeneration and of feeding new information into the store, the time available for computing and for performing any other necessary operation to determine the nature of the information to be recorded in a digit area is that between $t_1$ and $t_2$. This time may, for example, be 2½ microseconds and is found to be too short for many purposes.

It is the object of this invention to provide a method of and means for storing digital information in which the time during which the computing and other like operations can be carried out can be greatly increased.

Broadly this object is achieved by reading the information in a given digit area and returning the beam to this digit area, for refilling when this is required, only after the information on one or more further digit areas has been read.

According to the present invention, therefore, there is provided a method of recording digital information and of reading such information using an electrostatic storage device of the type set forth which comprises directing the beam successively upon the elemental area in each of a succession of digit areas to read the information on such elemental areas, after reading the information on an elemental area of the said succession directing the beam to the said adjacent area of a preceding digit area, and switching the beam on whilst directed upon such adjacent area in order to reduce the charge on the elemental area associated therewith. In a preferred method, after reading the information on each of the elemental areas the beam is directed upon the said adjacent area of a preceding digit area and the beam switched on only if required by the nature of the information to be stored. If desired, however, the step of directing the beam upon the preceding digit area may be omitted in those cases where no bombardment of the said adjacent area in such preceding digit area is required: that is when refilling is not required.

Figure 1($d$) shows one waveform which may be called a re-entrant stepped waveform and which may be employed according to this invention as X time-base waveform. The numerals 1 to 4, in this figure, represent arbitrary values of the X-deflecting voltage and therefore also represent the positions of four successive digit areas. It will be seen that during the reading time $t_1$ the deflecting voltage has a value 2. During the time $t_2$ to $t_3$ while refilling takes place the voltage level is 1. The voltage then proceeds to 3 for the next reading at $t_1'$. It returns to the level 2 for the subsequent refilling interval, which in the example given in Figure 1 is one in which no refilling takes place. The voltage then proceeds to value 4 for the reading time $t_1''$, back to 3 for the next refilling interval $t_2''$ to $t_3''$ and so on. It will be seen therefore that after reading the information in one digit area, the beam is returned to the preceding digit area in order to perform the necessary refilling in of that area when this is called for by the nature of the information to be stored.

The information in the digit area corresponding to the voltage 3 is read at the time $t_1'$. The latest time at which action can be taken in order to modify the charge in this digit area, if required, is the time $t_2''$, at which the beam has been returned to this digit area and at which a dash pulse (Fig. 1($a$)) must be initiated when required. The time between $t_1'$ and $t_2''$ is approximately 12.5 microseconds in the example being described. This time interval includes the time $t_1''$ at which the information is read from the digit area corresponding to the X voltage 4, and if the full time of 12.5 microseconds is made use of, it will be necessary to provide circuits capable of handling two successive items of data at the same time. This may not be convenient and it is therefore preferred to arrange that the time available is 9.5 microseconds, that is to say the time interval from $t_1'$ to the beginning of the "dot" interval in the digit area corresponding to the voltage 4, namely $t_0''$. Even with this reduction it will be noted that in the present example the time available for computing and the like is increased by the use of this invention from approximately 2.5 to approximately 9.5 microseconds.

A simple, single-digit storage device may be provided to store the information between the time when it becomes available from the computor or the like at or before the time $t_0''$ and the time $t_2''$ at which this information is utilised. An example of such a single-digit storage device will be given later. It will be observed that information read at the time $t_1'$ has to be "remembered" or stored outside the storage tube until it is made use of at a time $t_2''$. It is convenient to arrange, as shown in Figure 1($e$), that the "read" output signal shall extend for the interval of 10 microseconds between the times $t_1'$ and $t_1''$ and the source of this signal thus acts as a store during the interval $t_1'$ to $t_1''$. The storage outside the tube from the time $t_1'$ may thus be effected by the output pulse geenrator over the interval from $t_1'$ to $t_1''$ and by the single-digit store from $t_0''$ to $t_2''$: this provides a slight overlap between $t_0''$ and $t_1''$.

In Figure 2 of the accompanying drawing, there is shown a circuit diagram of one embodiment of the invention. A cathode ray tube 10 has an insulating screen 11 and a signal plate 12 capacitively coupled to the screen. The "read" unit 13 and "write" unit 14 are gate circuits which may be of the kind described in copending applications Serial No. 119,306, filed October 3, 1949, by F. C. Williams et al., now Patent No. 2,671,607, or Serial No. 124,192, filed October 28, 1949, by F. C. Williams et al. The output from the "read" unit passes through an output pulse generator 15 which generates pulses as shown in Figure 1($e$) when a positive pulse is received by the "read" unit from the signal plate 12, that is when a "1" has been read. This "read" output is applied to a computor 16 and the result of such computation, in so far as it affects the value of the digit just read, is passed to an auxiliary store 17. The output of this auxiliary store is applied to the "write" unit 14 which controls the grid voltage of the cathode ray tube 10. Thus when a "1" is to be written the "write" unit applies a "dash" pulse between times such as $t_2$ and $t_3$ to switch on the cathode ray beam during this interval.

In this example, a small Y deflection is applied from a generator 18 to the Y deflecting plates during each interval such as $t_2$ to $t_3$, but is only effective in producing any change in the charge on the elemental area when the beam is switched on during this time. The waveform of Figure 1($d$) is applied by the X time-base generator 19 to the X deflecting plates of the tube.

The waveform of Figure 1($d$) may, for example, be generated by combining the two waveforms shown in Figures 1($f$) and 1($g$) in any suitable combining circuit. The waveform of Figure 1($f$) is a stepped sawtooth waveform of known kind generated for example by combining a linear sawtooth waveform such as is used as a time base in cathode ray oscillographs with a linear triangular waveform of constant amplitude, that is a waveform consisting of a succession of linear rises and falls of equal duration. The waveform of Figure 1($g$) may be generated by suitably limiting in both senses the output from a sine wave generator.

As indicated in Figure 1($g$) the waveform of this Figure may be suppressed during those digit intervals when no modification of the charge is required, that is to say during those on which a "0" or "dot" is to be recorded. There is, however, no known advantage in suppressing this waveform and it will usually be more convenient to apply the X time-base waveform as shown in Figure 1($d$) continuously.

Figure 3:
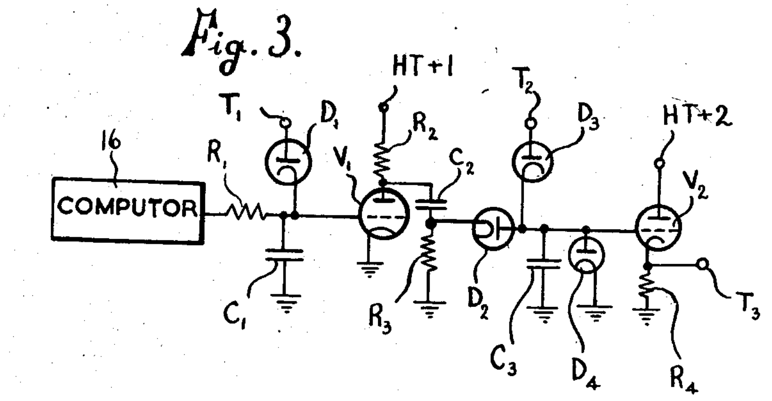

The auxiliary store may comprise what is known as a "shuffle" circuit and the circuit diagram of a suitable shuffle circuit is shown in Figure 3 of the accompanying drawings. In Figure 3 the output of the computor 16 is applied through a resistor $R_1$ to one plate of a capacitor $C_1$, to the cathode of a diode $D_1$ and to the control grid of a triode valve $V_1$. The other plate of the capacitor $C_1$ is earthed, the anode of the diode $D_1$ is connected to a terminal $T_1$, the cathode of the triode $V_1$ is earthed and the anode thereof is connected through a load resistor $R_2$ to the positive terminal HT+1 of a suitable source (not shown) of anode potential. The anode of the triode $V_1$ is connected to one plate of a capacitor $C_2$ whose other plate is connected through a resistor $R_3$ to earth and the junction of the capacitor $C_2$ and the resistor $R_3$ is connected to the cathode of diode $D_2$ whose anode is connected to the control grid of a further triode valve $V_2$. The control grid of the valve $V_2$ is also connected to the cathode of a diode $D_3$ to one plate of a capacitor $C_3$ and to the anode of a diode $D_4$. The anode of the diode $D_3$ is connected to a terminal $T_2$, the other plate of the capacitor $C_3$ is earthed and the cathode of the diode $D_4$ is earthed. The anode of the triode $V_2$ is connected to the positive terminal HT+2 of a suitable source (not shown) of anode potential and the cathode of the triode $V_2$ is connected to earth through a load resistor $R_4$. An output terminal $T_3$ is connected directly to the cathode of the triode $V_2$.

Positive-going resetting pulses are applied to the terminal $T_1$ at the instants $t_0$, $t_0'$, $t_0''$ etc. of Figure 1($a$). Positive-going resetting pulses are applied to the terminal $T_2$ at the instants $t_3$, $t_3'$, $t_3''$ etc. of Figure 1. The resetting pulses applied to the terminal $T_1$ may conveniently be the pulses occurring at the instants $t_0$, $t_0'$, $t_0''$ etc. of Figure 1 and the resetting pulses applied to the terminal $T_2$ may conveniently be derived from the trailing edges of the "dash" pulses.

It is arranged that the output from the computor is negative-going or is zero depending upon the information to be written. If there is output from the computor the capactitor $C_1$ is charged thereby with its upper plate in the drawing negative, it being arranged that the anode of the diode $D_1$ is biased negatively relatively to earth. On the occurrence of the next resetting pulse at the terminal $T_1$ the capacitor $C_1$ is charged positively thereby. As a result the potential at the anode of the valve $V_1$ falls and the capacitor $C_3$ becomes charged negatively through the diode $D_2$. On the occurrence of the next resetting pulse at the terminal $T_2$ the capacitor $C_3$ becomes discharged. The cathode follower constituted by the valve $V_2$ and its cathode load $R_4$ serves to reproduce the changes in potential across the capacitor $C_3$ at the output terminal $T_3$ which is connected to the "write" unit. The resistor $R_1$ allows the resetting pulses applied to the terminal $T_1$ to override the output from the computor should the output from the computor overlap in time with the resetting pulses applied to the terminal $T_1$.

Thus it will be seen that the circuit of Figure 3 has two stable conditions in a first of which the capacitor $C_3$ is charged and in a second of which the capacitor $C_3$ is discharged. Whenever the circuit is in its first stable condition and is reset to its second stable condition an output pulse appears and whenever the circuit is in its second stable condition and a resetting pulse occurs no output pulse is produced.

Figure 4:
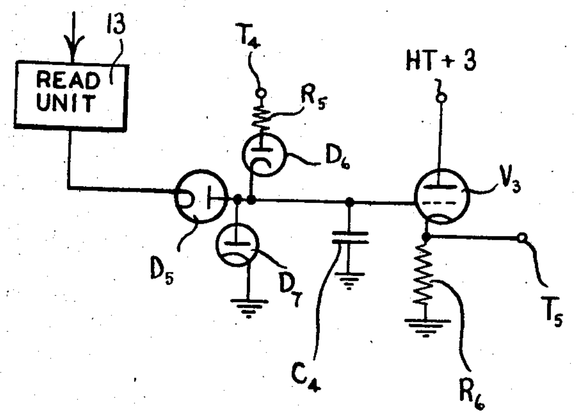

Referring to Figure 4 of the accompanying drawings, this is a theoretical circuit diagram of a suitable output pulse generator for use at 15 in Figure 2. The output of the "read" unit 13 is applied through a diode $D_5$ to the control grid of a triode valve $V_3$, to the cathode of a diode $D_6$, to the anode of a diode $D_7$ and to the upper plate in the drawing of a capacitor $C_4$. The anode of the diode $D_6$ is connected through a resistor $R_5$ to a terminal $T_4$, the cathode of the diode $D_7$ is earthed and the other plate of the capacitor $C_4$ is earthed. The anode of the triode $V_3$ is connected to the positive terminal HT+3 of a suitable source (not shown) of anode potential, and the cathode of the triode $V_3$ is connected to earth through a load resistor $R_6$. An output terminal $T_5$ is connected directly to the cathode of the triode $V_3$.

In operation resetting pulses are applied to the terminal $T_4$ which is normally biased negatively, the resetting pulses being positive-going. At an instant such as $t_1'$ in Figure 1 current flows into the capactitor $C_4$ from the "read" unit charging the capacitor $C_4$ with its upper plate negative. Thus a negative pulse appears at the output terminal $T_5$ which is connected to the computor. The resetting pulses occur at the instants $t_1'$, $t_1''$ etc. and cause the capacitor $C_4$ to become discharged. Thus the waveform shown in Figure 1($e$) is produced.

If desired, the time available for computing or the like can be further increased by arranging to regenerate the information on a given digit area after the next two or more items have been read. This can be effected by increasing the amplitude of the pulses in Figure 1($g$) to an appropriate value. When this is done however, the computing and associated circuits must be capable of handling more than one item of date at the same time.

If the increased time for computing and the like is not required, the output pulse generator and the auxiliary store can be omitted and the computor arranged to connect the output of the "read" unit directly to the input of the "write" unit whereby each digit area records the item of information which was previously recorded in the following digit area. If the item of data represents the digit of a binary number stored in the usual way, this operation is equivalent to division by two, an operation which is difficult to perform with present methods of using the cathode ray tube storage device. Division by higher powers of two may be effected by regenerating in each digit area the information read from a digit area two or more digit periods later by appropriate adjustment of the amplitude of the pulses of Figure 1($g$).

We claim:

1. A method of recording digital information and of reading such information using an electrostatic storage device, the method comprising the steps of directing a cathrode ray beam successively upon an elemental area in each of a succession of digit areas to read the information on such elemental areas, after reading the information on each elemental area of the said succession directing the beam to an area adjacent a preceding elemental area, and, when required by the nature of the digit to be stored on said preceding elemental area, switching the beam on whilst directed upon such adjacent area in order to reduce the charge on said preceding elemental area.

2. A method according to claim 1, wherein the output resulting from the reading of the information stored on an elemental area is stored in an auxiliary store for an interval of time such that when the beam is later directed upon the adjacent area associated with the last said elemental area information dependent upon the said output is written on to the last said area.

3. A method according to claim 1, wherein the output resulting from the reading of the information on an elemental area is applied to determine the information to be written on to said digit area.

4. An electrostatic storage device comprising a cathode ray tube, an electric charge-retaining surface in said tube, means adjacent the cathode ray beam of said tube to deflect said beam over said surface, a re-entrant stepped waveform generator generating a voltage of a waveform having a plurality of successive maximum and minimum amplitude values which vary progressively in the same sense, and means coupling said generator to said deflecting means, whereby said beam is directed successively upon elemental storage areas of said surface, and, after direction of said beam upon each said elemental area said beam is directed upon an area of said surface in the proximity of a preceding one of said elemental areas.

5. A device according to claim 4, wherein each said maximum amplitude value is substantially equal to a minimum value next but one thereto.

6. A device according to claim 4 comprising means for controlling the intensity of said beam, means to generate first and second trains of switching pulses, the pulses of one of said trains occurring during said maximum amplitude values and the pulses of the other of said trains occurring during said minimum amplitude values, means to couple the means generating said first train of pulses to said beam intensity controlling means to increase the intensity of said beam on the occurrence of pulses of said first train, and means to apply information to be stored to control the application of said second train of pulses to said beam intensity controlling means to increase said beam intensity when required by the nature of the information to be stored.

7. A device according to claim 6 comprising second deflecting means adjacent said beam to deflect said beam in a direction inclined to the direction of deflection by the first said deflecting means, means for generating deflecting pulses occurring during the occurrence of the pulses of said second train, and means to apply said deflecting pulses to said second deflecting means.

8. A device according to claim 4, wherein said waveform has portions of substantially constant value at said maximum and minimum values.

9. An electrostatic storage device comprising a cathode ray tube, an electric charge-retaining surface in said tube, a pick-up plate capacitively coupled to said surface, means adjacent the cathode ray beam of said tube to deflect said beam over said surface, a re-entrant stepped waveform generator generating a voltage of a waveform having a plurality of successive maximum and minimum amplitude values which vary progressively in the same sense, means coupling said generator to said deflecting means, whereby said beam is directed successively upon elemental areas of said surface to generate in said pick-up plate signal voltages corresponding to the charges upon said elemental areas, and, after direction of said beam upon each said elemental area, said beam is directed upon an area of said surface adjacent a preceding one of said elemental areas, means for controlling the intensity of said beam, voltage-storing means having input and output terminals, means coupling said pick-up plate to said input terminals to apply said signal voltages to said input terminals, and means coupling said output terminals to said beam intensity controlling means.

10. An electrostatic storage device according to claim 9, wherein each said maximum amplitude value is substantially equal to a minimum value next but one thereto.

11. An electrostatic storage device according to claim 9, wherein said means coupling said output terminals to said beam intensity controlling means include a computor.

12. An electrostatic storage device according to claim 9, in combination with a computor having input terminals coupled to said pick-up plate and output terminals coupled to the input terminals of said voltage-storing means, said storage device also including pulse generators to generate at output terminals thereof first and second trains of switching pulses, the pulses of one of said trains occurring during said maximum amplitude values and the pulses of the other of said trains occurring during said minimum amplitude values, and means to couple the generator of said first train of pulses to said beam intensity controlling means to increase the intensity of said beam on the occurrence of pulses of said first train, said means coupling said output terminals of said voltage-storing means to said beam intensity controlling means including the generator of said second train of pulses and means responsive to voltages at the output terminals of said voltage-storing means to permit and prevent the application of pulses of said second train of pulses to said beam intensity controlling means.

13. In the recording and reading of digital information stored on a storage screen in the form of a succession of electrostatic charges spaced apart at predetermined intervals upon a surface of said screen, the method of directing an electron beam upon said charges which comprises moving said electron beam along a scanning path in a succession of steps each comprising a forward movement in said path over at least two of said intervals followed by a backward movement in said path of at least one of said intervals.

14. A method according to claim 13, wherein the beam is switched on at the end of each said forward movement.

15. A method according to claim 13, wherein the beam is switched on at the ends of said backward movements when required by the nature of the information to be stored.

16. A method of recording digital information and of reading such information using an electrostatic storage device in which the information is recorded in the form of different electric charge conditions on digit areas of a recording surface, the method comprising directing a cathode ray beam to bombard at least a part of each of a plurality of said digit areas in a predetermined sequence in order to read the information on such areas, and after said bombardment of one of the digit areas in said sequence and before the said bombardment of the next digit area in said sequence, directing the cathode ray beam to re-bombard at least a part of a further digit area of said sequence preceding the said one digit area in order to modify the charge condition on the said further digit area.

17. A method of recording digital information and of reading such information using an electrostatic storage device in which the information is recorded in the form of different electric charge conditions on digit areas of a recording surface, one of said charge conditions being produced on a digit area by a first bombardment by a cathode ray beam of at least a part of the digit area followed by a second bombardment by said beam of a part of said digit area different from that bombarded during said first bombardment, the other of said charge conditions being produced by said first bombardment alone, said first bombardment generating a read output signal representative of the charge on the digit area, and said second bombardment serving to modify the charge produced on the digit area by the said first bombardment, said method comprising controlling the cathode ray beam to effect said first bombardment of a selected digit area, subsequently, but before carrying out a further first bombardment of said selected digit area, controlling the cathode ray beam to effect said second bombardment of said selected digit area, and in the interval between said first and second bombardments of said selected digit area controlling said beam to effect a first bombardment of at least one other digit area.

References Cited in the file of this patent

UNITED STATES PATENTS

| | | |
|---|---|---|
| 2,093,157 | Nakashima et al. | Sept. 14, 1937 |
| 2,446,945 | Morton et al. | Aug. 10, 1948 |
| 2,468,100 | Moskowitz | Apr. 26, 1949 |
| 2,472,165 | Mankin | June 7, 1949 |
| 2,474,812 | Arditi et al. | July 5, 1949 |
| 2,589,460 | Tuller | Mar. 18, 1952 |
| 2,598,919 | Jensen | June 3, 1952 |
| 2,639,425 | Russell et al. | May 19, 1953 |
| 2,642,550 | Williams | June 16, 1953 |
| 2,671,607 | Williams et al. | Mar. 9, 1954 |

OTHER REFERENCES

Article by J. P. Eckert et al. entitled, "A dynamically regenerated electrostatic memory system," published in the Proceedings of the I. R. E. of May 1950, pages 498 to 510.